Oct. 9, 1956

K. G. HEPLER 2,765,646

EQUIPMENT INTERLOCKS

Filed Oct. 22, 1952

4 Sheets-Sheet 1

INVENTOR.
KENNETH G. HEPLER
BY
Ostrolenk & Faber
ATTORNEYS

Oct. 9, 1956

K. G. HEPLER 2,765,646

EQUIPMENT INTERLOCKS

Filed Oct. 22, 1952

4 Sheets-Sheet 2

INVENTOR.
KENNETH G. HEPLER

BY

Ostrolenk & Faber

ATTORNEYS

Oct. 9, 1956 K. G. HEPLER 2,765,646

EQUIPMENT INTERLOCKS

Filed Oct. 22, 1952 4 Sheets-Sheet 3

INVENTOR.
KENNETH G. HEPLER

BY

Ostrolenk & Faber

ATTORNEYS

INVENTOR.
KENNETH G. HEPLER

BY

Ostrolenk & Faber

ATTORNEYS.

United States Patent Office 2,765,646

Patented Oct. 9, 1956

2,765,646

EQUIPMENT INTERLOCKS

Kenneth G. Hepler, Greensburg, Pa., assignor, by mesne assignments, to I-T-E Circuit Breaker Company, Philadelphia, Pa., a corporation of Pennsylvania Application October 22, 1952, Serial No. 316,193

6 Claims. (Cl. 70—58)

My invention relates to an interlocking system for interlocking a quantity of equipment in such a manner that authorized users of the equipment will be required to leave their identification at the equipment station before removing the equipment and in which the authorized user can recover his identification only after returning the equipment.

More specifically, my invention relates to a novel interlock arrangement utilizing an identification key which is retained at a normal storage point or at the equipment station at which equipment can be selectively removed only when two keys are used, a first key being attached to the equipment and the second key belonging to and identifying authorized personnel.

In order to remove the equipment from the equipment station, it is necessary to simultaneously use both the identification key and equipment key in the padlock so that after removal of the equipment, only the identification key will remain.

Thus, my novel interlocking means is not merely for the purpose of padlocking equipment so that it can not be removed but provides indication that something has been done in an improper sequence.

Thus, when equipment is removed from its station in an industrial plant and not returned by its user, an identification key retained at the station with a code number thereon will identify the user since it is necessary for him to insert his identification key in the padlock before removal of the equipment.

In industrial plants, it is usually necessary to maintain various stations or stalls to store and house equipment which is to be used at various places in the plant. For example, it is the practice to provide separate supports for such equipment as electrical fork trucks, tools, fixtures, ladders and other portable equipment.

Thus, various maintenance crews, repair teams and other employees are able to obtain the desired equipment from the various stations and move it to any portion of the plant.

Heretofore, in instances where it is uneconomical to provide an attendant for each of these equipment stations, considerable difficulty has been encountered by having authorized and unauthorized personnel remove the equipment without returning it to its proper location.

This has the disadvantage of:

(1) Resulting in a hardship for the next person who desires to use the equipment since it becomes necessary to search throughout the plant for the equipment thereby resulting in lost time;

(2) Causing unsafe conditions and accidents to occur to personnel and property due to the fact that equipment such as ladders or electrical fork trucks may be left in portions of the plant where employees do not expect to find them;

(3) Unauthorized use of the equipment by personnel who may not be familiar with the operation of the equipment; and (4) Hampers and interferes with production.

My invention is preferably used with a bi-centric padlock which requires that two keys be inserted in order to remove either of the keys. That is, a bi-centric padlock which requires two keys to open it and permits removal of only one key of the two keys at a time.

With the interlocking arrangement of my invention, a first key is chained to the equipment and a second key is carried by the authorized individual and is marked in an appropriate manner to identify him.

A padlock is chained to a wall at the equipment station and is provided with two plugs or cylinders, one to receive the first key belonging to the equipment and a second plug to receive the second key which identifies the authorized user.

A hasp or eyelet is fastened to the equipment to receive a shackle of the padlock as the equipment is locked in place.

When a maintenance man or authorized individual, hereinafter referred to as an operator, desires a piece of equipment, he inserts his operator's key, which carries a code to identify him as the owner thereof, in the padlock. Since the equipment key is already positioned in one plug of the bicentric pedlock, the operator is able to open the lock with his operator's key.

The padlock may then be removed from the hasp which is connected to the equipment and since the padlock has the two keys located therein, the equipment key may be withdrawn therefrom. The equipment key which is attached to the apparatus is removable therewith when the padlock is removed from the hasp.

Hence, the operator will have full use of the equipment and while it is in his possession, his operator's key will be retained in the second plug of the padlock and remain at the station as an identification of the user of the equipment.

Accordingly, if he fails to return the equipment to its proper location, his identity is revealed by his operator's key which remains at the station.

It will be noted that since the padlock requires two keys to be inserted in the cylinders before either of them can be removed, the operator will not be able to remove his key until the equipment key is inserted in the padlock.

On return of the equipment by the operator to the proper station, the equipment key, which is attached to the equipment, will be inserted in the padlock and the padlock shackle will be locked through the hasp of the equipment. With both keys now in the two cylinders of the padlock, the operator may remove his identification key therefrom.

Thus, the equipment will not be able to be removed from its location in the station until another identification key is inserted in the padlock.

Thus, it will be seen that with my novel interlocking means, the operator key is retained in the padlock at the station until the equipment has been returned by him to thereby give a positive indication of the user of the equipment.

Accordingly, the operator will have to return the equipment to the station in order to reobtain his identification key. Furthermore, the operator will feel compelled to take care and return the equipment so as to prevent any unknown individual from returning it to the station and obtaining his identification key.

Furthermore, in my novel interlocking means, the keys attached to each piece of equipment are all different so that it will be impossible for anyone to accidentally return a piece of equipment to the wrong station or position within any station and obtain another party's identification key.

Several modifications of my invention propose the use of a type of interlock wherein a latch block is chained to the equipment so as to lock it at the station. An operator's key is used to unlock the unit and will be retained while the unit is in use.

Although this means is simpler in construction than the system using the bi-centric padlock, in that it doesn't require a separate equipment key, it has the disadvantage in that the equipment may be returned to any location within a station rather than a predetermined location as above noted.

Another modification consists of an interlock, having two cylinders in one housing, as a functional equivalent of the bi-centric padlock having two plugs in a single housing.

Accordingly, it is a primary object of my invention to provide an interlock arrangement which will prevent authorized personnel or operators from absent-mindedly or unintentionally doing an unauthorized act.

A further object of my invention is to provide an interlock arrangement wherein the user of equipment will be compelled to leave identifying means at an equipment station during the period of time that the equipment is removed from the station.

Another object of my invention is to provide an interlocking arrangement for industrial equipment utilizing a bi-centric padlock which enables only one of two keys at a time to be removed to thereby permit only authorized personnel to use the equipment and requires same to leave identification at the equipment station while the equipment is in use.

A further object of my invention is to provide an interlocking means which will be effective to induce authorized personnel or the operator of the equipment to return the loaned equipment to its proper station in order to reobtain his identification key.

Another object of my invention is to provide an arrangement in which the operator can recover his identification key only after he has returned the equipment to its proper location.

A further object of my invention is to provide an arrangement for the interlocking of the industrial equipment which will insure that the user thereof will return the equipment to its proper location to thereby prevent accidents or injury to personnel and equipment, eliminate waste of time, prevent interference with production and insure that unused equipment is always available for authorized personnel.

These and other objects of my invention will be apparent from the following description taken in connection with the drawings, in which.

The interlock arrangement of my invention may be used with various types of industrial equipment such as electric fork trucks, tools, fixtures, ladders, etc.

For purposes of illustration, I have shown my invention in connection with an interlocking arrangement for ladders although my invention is not restricted thereto.

In a preferred embodiment is shown a bi-centric padlock to be used with my interlocking unit although other standard padlocks may be used.

The bi-centric padlock 24 used in connection with the interlocking arrangement is a standard unit which requires that two keys be inserted in the lock in order to unlock the unit and in order to remove one key. This padlock not only requires that two keys be inserted before one of them can be removed, but also constructed so that only one key is removable at any given time.

It will be noted that the locking device 24, used in connection with my invention may be any multi-locking device or bi-centric locking device and is not limited to the padlock shown in the preferred embodiment of Figures 7, 8, 9 and 10.

In my arrangement, authorized personnel, hereinafter referred to as operators, are each provided with a key which carry proper indicia to identify the holder of the key.

This operator's key fits any of the padlocks which lock equipment of which the operator is authorized to use.

A second key is chained to the equipment, such as a ladder in the illustrations of my invention, to be inserted in a second cylinder of the bi-centric padlock.

Figures 1, 2:
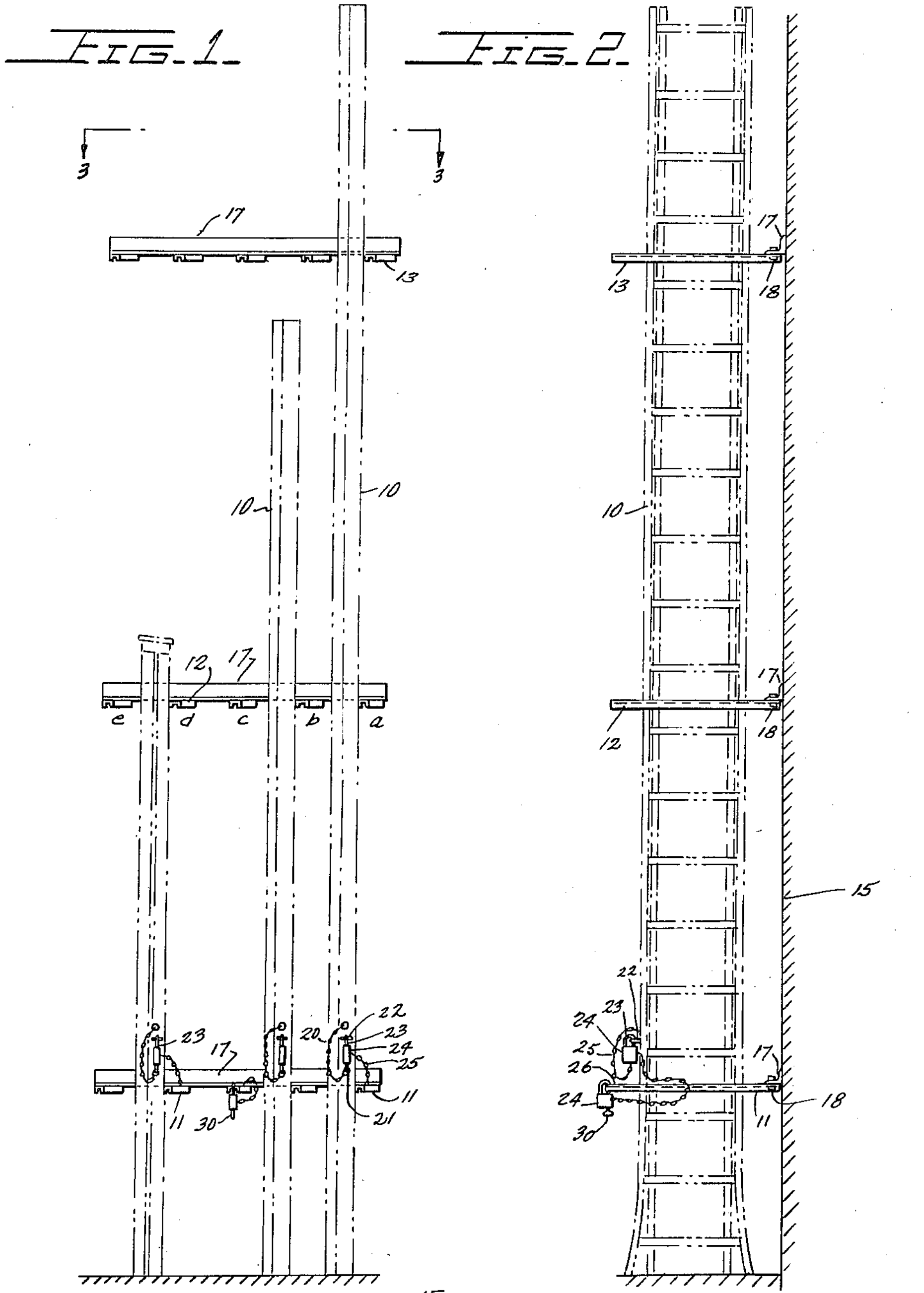
Figure 1 is a front view illustrating a station for housing industrial equipment such as ladders and showing my novel interlocking arrangement.
Figure 2 is a side view of the equipment station with the equipment located therein.
Figure 3:
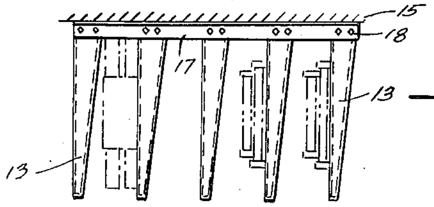
Figure 3 is a view taken along the line 3—3 of Figure 1.

Thus, as seen in Figures 1, 2 and 3, the equipment station for ladders 10 consist of a plurality of racks 11, 12 and 13 rigidly secured to the wall 15 by means of bolts and brackets 17 and 18. The plurality of racks 11, 12 and 13 serve as positioners and supports for the equipment or ladders 10.

Each ladder is provided with a chain 20 secured thereto at one end and having a ladder key 21 secured at the other end thereof.

An eyelet 22 is also secured to each of the ladders in order to receive the shackle 23 of the bi-centric padlock 24. The bi-centric padlock 24 is provided with a chain 25 which is secured thereto at one end thereof and secured to the supporting brackets 11 at the other end thereof.

Thus, at the station illustrated in Figures 1, 2 and 3, there are a plurality of locations A, B, C and D to store and support the ladders 10 with each location provided with identical interlocking arrangement consisting of the bi-centric padlock 24 chained to the support 11 with each piece of equipment 10 having an equipment key 21 attached thereto by chain 20 and having an eyelet 22 secured to the equipment.

Thus, as seen at locations A, B, and D, the ladders 10 are retained in position and can not be removed therefrom due to the locking of the shackle 23 with the equipment eyelet 22 in the location of the ladder key 21 in the bi-centric padlock 24.

As noted, in order to unlock the padlock 24 and remove a key therefrom, it will be necessary to have two keys inserted in the padlock. Thus, the ladders positioned at locations A, B and D can not be removed therefrom by personnel who do not have identification or operators' keys for the bi-centric padlock 24.

When an operator desires to remove a ladder from one of the locations, the station illustrated in Figures 1, 2 and 3, he must insert his identification key 30 in the appropriate cylinder of the bi-centric padlock 24.

This will enable him to (1) unlock the padlock 24 from the eyelet 22 and (2) remove the ladder key 21 from the padlock 24 to thereby enable him to remove the ladder 10 from its location at the station.

Location C illustrates the position of the various parts after the equipment has been removed. As best seen in Figures 1 and 2, the operator can insert the open padlock 24 in an appropriate hole 26 located in the support member 11 after the equipment is removed.

It will be noted that his identification key 30 remains in the bi-centric padlock 24 and can not be removed therefrom.

Since the operators' key 30 bears the identification of the owner, it will clearly indicate the particular person which removed the equipment from the station and hence, will provide inducement for the operator to return the equipment to the proper location in order to reobtain his key. Several variations and modifications of the arrangement shown in Figures 1, 2 and 3 are possible. For example, the ladder keys 21 at locations A, B, C and D may all be different so that they may only be inserted in their associated padlocks 24 located at their particular station.

When this arrangement is used, the operator will be compelled to return the ladder only to its designated location within a station, for example location C, in order to reobtain his operator's key.

However, in a more economical design, all of the ladder keys 21 for the ladders positioned at locations A, B, C and D, etc., may be identical. In this arrangement, the operator could return the ladder to any location, for example a ladder borrowed from location C could be returned to a second location such as A, B or D, and the operator could then obtain another person's identification key.

However, since his identification key will continue to remain at the original location, it is highly improbable that the authorized personnel or operator would permit the operators' key 30, herein his identification, to remain at the location as tell-tale evidence.

Hence, the arrangement insures that not only will the equipment be returned to the proper station but also that it will be returned to its designated location within a station.

When the operator returns the borrowed ladder 10 to location C, he merely inserts the equipment in its proper upright position against the support brackets 11, 12 and 13 and inserts the ladder key 21 in the padlock 24. The padlock 24 can then be removed from the hole 26 in the support bracket 11 and reinserted in the eyelet 22 which is attached to the ladder 10.

Since both the ladder key 21 and the operator's key 30 are inserted in the bi-centric padlock 24, the operator may then remove his operator's key 30 therefrom for use at some future time.

The bi-centric padlock 24 which is used at locations A, B, C and D in Figures 1, 2 and 3 is illustrated in detail in Figures 7, 8, 9 and 10.

It will be noted that this bi-centric padlock is not claimed to be new or novel with the applicant.

The bi-centric padlock 24 is provided with a shell 40 having openings 41 and 42 to receive the shackle 23.

The main housing 43 of the padlock houses two cylinders 44 and 45 which are to receive the ladder key 21 and operator's key 30, respectively.

A shackle spring 46 is inserted in the opening 47 of the housing 43 and is seated below the shackle 23 to bias it upwardly when the lock is open.

Locking bar 48 having three openings 49, 50 and 51 is positioned on top of the housing 43 so that the center pin 53 is seated in the opening 50 and the cam pins 54 and 55 are received in the openings 49 and 51, respectively.

Figure 8:
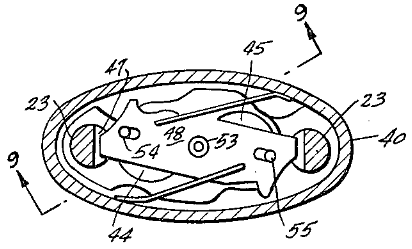
Figure 8 is a top view taken along the line 8—8 of Figure 7 illustrating the locking bar and associated cam pins for the bi-centric padlock used in my novel arrangement.
Figure 7:
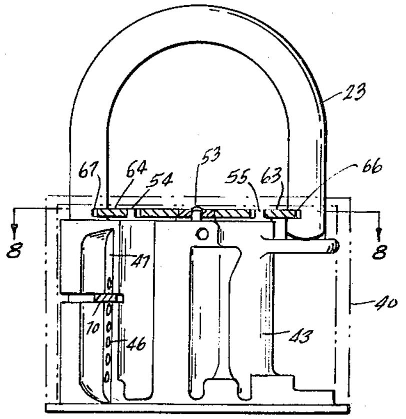
Figure 7 is a side view of the housing with the shell removed of the bi-centric padlock used in my invention.
Figure 9:
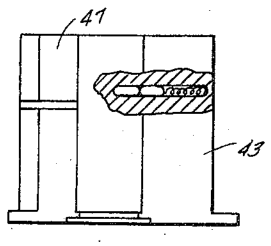
Figure 9 is a view taken along the line 9—9 of Figure 8.
Figure 10:
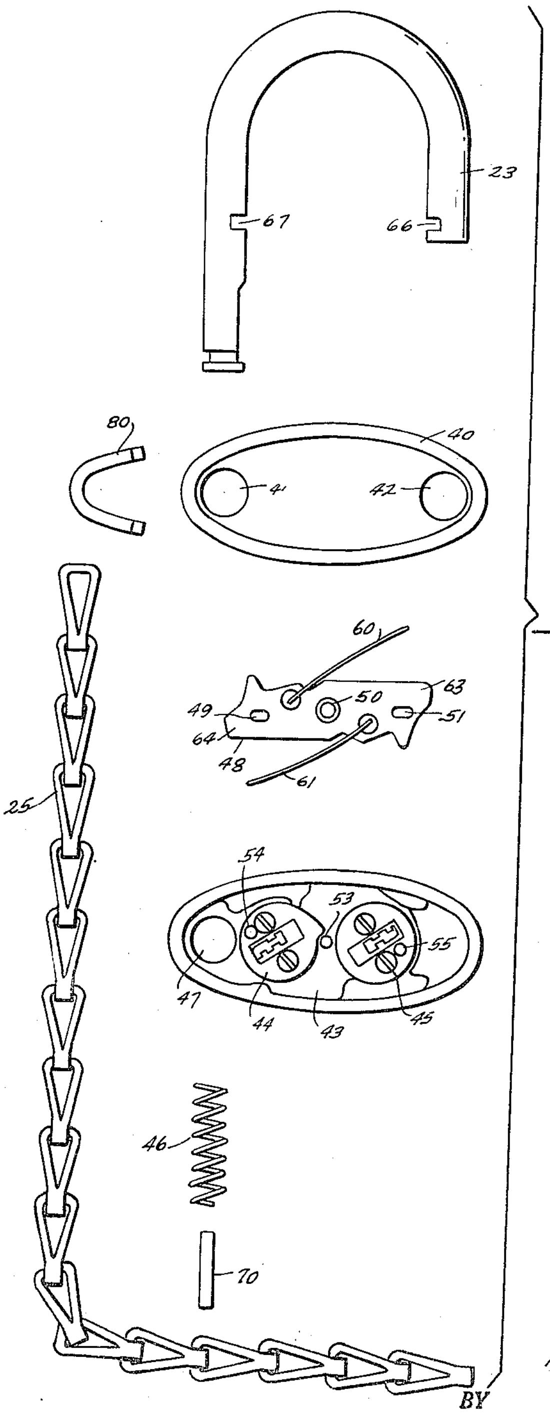
Figure 10 is a view of the various components used in the bi-centric padlock of Figures 7, 8 and 9.

The locking bar 48 is provided with resilient means 60 and 61 which are urged against the shell 40 in order to bias the locking bar 48 clockwise, as seen in Figure 8.

When the padlock 24 is in the locked position, the cam edges 63 and 64 of the locking bar 48 are urged into the recesses 66 and 67 of the shackle 23, due to the rotation of the locking bar 48 by the cam pins 54 and 55, respectively, to thereby hold the padlock in the locked position.

The shackle 23 is slidably held within the opening 47 of the housing 43 by means of the shackle retainng pin 70 which is received in an appropriate opening in the housing 23 and biased upwardly by the shackle spring 46.

As is well known in the art, the bi-centric padlock 24, illustrated in Figures 7, 8, 9 and 10, requires two keys to be inserted in the cylinders 44 and 45 before the padlock can be opened and before a key may be removed therefrom.

Figure 6:
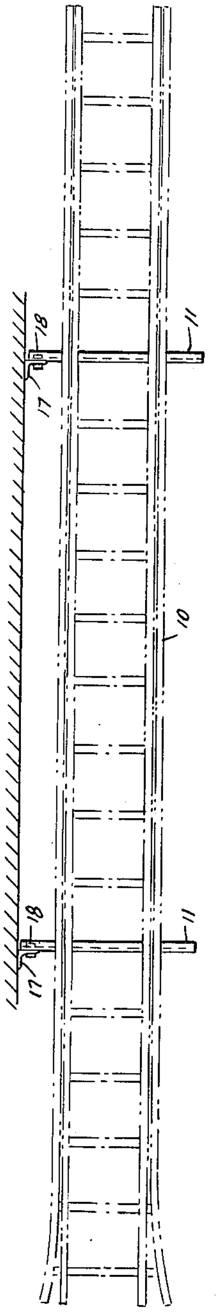
Figure 6 is a side view of Figure 4.
Figures 4, 5:
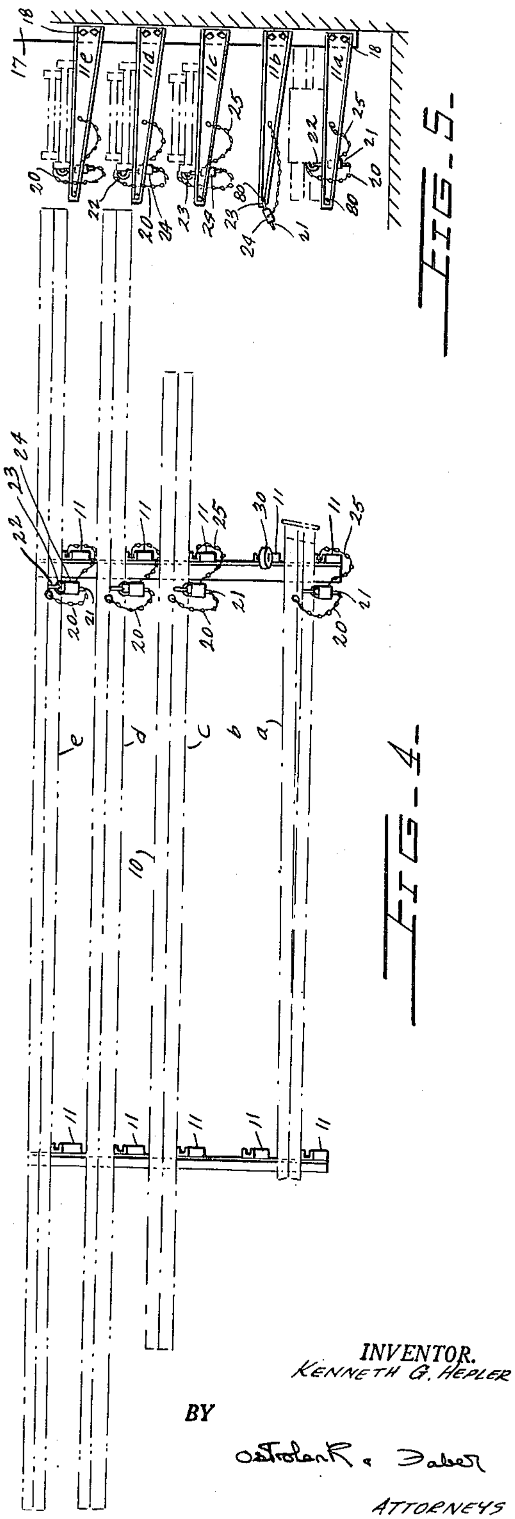
Figure 4 is a side view of another arrangement for horizontal ladder storage illustrating my novel interlocking arrangement.
Figure 5 is an end view of Figure 4.

Figures 4, 5 and 6 illustrate a modification of my invention and the numerals of Figures 1, 2 and 3 are used in these figures to indicate similar components.

In this arrangement, the equipment station is provided for horizontal storage of ladders to indicate the flexibility of the system. However, the interlocking arrangement is identical to that described for Figures 1, 2 and 3.

For example, the padlocks 24 are chained to the support brackets 11 by means of chain 25, and an eyelet 22 to receive the shackle 23 is attached to each piece of equipment 10. The ladders 10 are provided with a ladder key 21 which are attached thereto by means of chain 20. Hence, in order to remove the ladder from any one of the locations A, B, C, D and E of the station, illustrated in Figures 4, 5 and 6, the operator will be required to insert his operator's key 30 in one cylinder of the bi-centric padlock 24. This will enable him to unlock the padlock 24 from the ladder eyelet 22 and also remove the ladder key 21 from the padlock 24.

Hence, the equipment, such as ladder 10, can be removed from the station and the operator can insert the shackle 23 of the padlock 24 in the opening 80 of the support 11 after which the ladder is removed, as seen in location B of Figure 5.

When the operator has finished using the ladder 10, he will return it to station B in order to reobtain his identification key 30. This is done by positioning the ladder 10 horizontally on the brackets 11, inserting the ladder key 21 in the appropriate cylinder of the padlock 24, removing the padlock 24 from the hole 80 in the support 11, locking the shackle 23 of the lock 24 in the eyelet 22. The ladder 10 is then locked in its appropriate position at location B and the operator can then remove his identification key 30.

Accordingly, I have provided a novel interlocking arrangement wherein industrial equipment can be secured at a location in such a manner that only authorized personnel will be permitted to use the equipment. However, after the authorized personnel removes the desired equipment from a particular location within the station, he will be compelled to leave this identification key at the location.

Hence, in the event the equipment is not returned by the operator to its proper location, the user thereof can rapidly and easily be identified by his identification key which remains at the station.

Accordingly, the operator will be inclined to return the equipment to its designated location within a station in order to reobtain his identification key.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. In an interlocking arrangement for a plurality of pieces of industrial equipment comprising a station having a plurality of locations, a plurality of bicentric padlocks each having a shackle and two plugs to receive an equipment key and an operator's key; one of said bicentric padlocks being chained to each location within said station, an equipment key being chained to each piece of equipment, an eyelet being provided on each piece of equipment to receive the shackle of one of said bicentric padlocks, each piece of equipment being locked at its location within said station by locking the respective shackle of the respective bicentric padlock through the respective eyelet of the respective piece of equipment and retention of the respective equipment key in one plug of the respective padlock, whereby when an operator's key is inserted and locked in the second plug of any one of said padlocks in order to unlock the shackle thereof from the respective eyelet and to enable removal of the respective equipment key from the first plug, one padlock and said operator's key is locked at the respective location after removal of the respective piece of equipment, and said operator's key serving as means of identification of the user of the respective piece of equipment, said operator's key being adapted to be selectively received in the second plug of each of said padlocks at each location.

2. In an interlocking arrangement for a plurality of pieces of industrial equipment comprising a station having a plurality of locations, a plurality of bicentric locking devices each having a shackle and two plugs to receive an equipment key and an operator's key; one of said bicentric devices being chained to each location within said station, an equipment key being chained to each piece of equipment, an eyelet being provided on each piece of equipment to receive the shackle of one of said bicentric devices, each piece of said equipment being locked at its location within said station by locking the respective shackle of one of the respective bicentric devices through the respective eyelet of the respective piece of equipment and retention of the respective equipment key in one plug of the respective device, an operator's key adapted to be inserted in the second plug of any one of said devices in order to unlock the shackle thereof from the respective eyelet and to enable removal of the respective equipment key from the first plug, one device and said operator's key remaining locked at the respective location after removal of the respective piece of equipment, said operator's key serving as means of identification of the user of the respective piece of equipment, the respective piece of equipment relocked at said station by inserting said equipment key in the first plug of the respective device to thereby permit locking of the respective device through the respective eyelet on removal of said operator's key, said operator's key being operative to effect removal of said equipment and said equipment key from each of said plurality of locations.

3. An interlocking system for a plurality of pieces of equipment comprising a station having a plurality of locations, each of said locations having a bicentric padlock chained thereto, each of said bicentric padlocks having a shackle and a first and second plug to receive an equipment key and an operator's key, an equipment key being permanently chained to each piece of equipment stored at each location of said station, each piece of equipment being locked at each location by locking engagement of a shackle of the respective bicentric padlock with an eyelet secured to the respective piece of equipment and the engagement of said equipment key with a cylinder of the respective padlock, an operator's key being required for the respective padlock in order to remove the respective shackle from the respective eyelet and to remove the respective equipment key from the respective padlock to thereby enable removal of the respective piece of equipment from its location within said station, each piece of equipment relocked at its respective location within said station by inserting the respective equipment key in the respective padlock to thereby permit relocking of the respective shackle with its respective eyelet and permit removal of said operator's key, said operator's key being operative to effect removal of said equipment and said equipment key from each of said plurality of locations.

4. In an interlocking arrangement for industrial equipment comprising a station having a location, a bicentric locking means having a shackle and a first and second plug to receive an equipment key and an operator's key; said bicentric locking means being chained to said location within said station, an equipment key being chained to said equipment, said equipment being provided with an eyelet to receive said shackle of said bicentric locking means, said equipment being locked at its location within said station by locking said shackle of said bicentric locking means through said eyelet of said equipment and retention of said equipment key in said first plug of said padlock, an operator's key adapted to be inserted in said second plug of said padlock in order to unlock said shackle from said eyelet and to enable removal of said equipment key from said first plug, said bicentric locking means and said operator's key remaining and locked at said location after removal of said equipment, and said operator's key serving as a means of identification of the user of said equipment.

5. In an interlocking arrangement for industrial equipment comprising a station having a location, a multi-locking device having a shackle and two plugs to receive an equipment key and an operator's key; said multi-locking device being chained to said location within said station, an equipment key chained to said equipment, said equipment being provided with an eyelet to receive said shackle of said multi-locking device through said eyelet of said equipment and retention of said equipment key in one plug of said multi-locking device, an operator's key adapted to be inserted in the second plug of said padlock in order to unlock said shackle from said eyelet and to enable removal of said equipment key from said first plug, said multi-locking device and said operator's key remaining locked at said location after removal of said equipment, said operator's key serving as means for identification of the user of said equipment, said equipment being relocked at said station by inserting said equipment key in the first plug of said multi-locking device through said equipment eyelet on removal of said operator's key.

6. An interlocking system for industrial equipment comprising a station having a location, equipment positioned at said location, a multi-locking device chained to said location, said multi-locking device having a shackle and two key plugs adapted to receive an operator's key and an equipment key, an equipment key being permanently chained to said equipment stored at said location of said station, said equipment being locked at said location by locking engagement of the shackle of said multi-locking device with an eyelet secured to said equipment and the engagement of said equipment key with a plug of said multi-locking device, an operator's key being required in said device in order to remove said shackle from said eyelet and to remove said equipment key from said device to thereby enable removal of said equipment from its location within said station, said equipment being relocked at said location within said station by inserting said equipment key in said device to thereby permit relocking of said shackle with said eyelet and permit removal of said operator's key.

References Cited in the file of this patent

UNITED STATES PATENTS

| | | |
|---|---|---|
| 518,317 | Hart | Apr. 17, 1894 |
| 1,256,721 | Murray | Feb. 19, 1918 |
| 1,652,233 | Branick | Dec. 13, 1927 |
| 1,962,561 | Hartzell | June 12, 1934 |
| 2,220,786 | Grainger | Nov. 5, 1940 |
| 2,291,381 | Drake | July 28, 1942 |
| 2,336,936 | Johnson | Dec. 14, 1943 |